United States Patent
Urushihara et al.

(10) Patent No.: US 8,504,101 B2
(45) Date of Patent: Aug. 6, 2013

(54) MULTIMODE WIRELESS COMMUNICATION APPARATUS AND WIRELESS COMMUNICATION METHOD

(75) Inventors: Tomoya Urushihara, Chiba (JP);
Akihiko Matsuoka, Kanagawa (JP);
Katsuaki Abe, Kanagawa (JP); Kentaro Miyano, Kanagawa (JP); Takenori Sakamoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 975 days.

(21) Appl. No.: 12/067,062

(22) PCT Filed: Sep. 25, 2006

(86) PCT No.: PCT/JP2006/318926
§ 371 (c)(1),
(2), (4) Date: Mar. 17, 2008

(87) PCT Pub. No.: WO2007/034937
PCT Pub. Date: Mar. 29, 2007

(65) Prior Publication Data
US 2009/0135760 A1    May 28, 2009

(30) Foreign Application Priority Data

Sep. 26, 2005 (JP) .................................. 2005-277767
Sep. 12, 2006 (JP) .................................. 2006-246533

(51) Int. Cl.
*H04M 1/00*    (2006.01)
(52) U.S. Cl.
USPC ................... 455/552.1; 455/553.1; 455/550.1

(58) Field of Classification Search
USPC ................ 455/552.1, 418, 432.1, 127.4, 441, 455/440, 445, 435.2, 525, 436, 118; 375/295, 375/340, 296, 299, 302, 147, 130, 259, 345, 375/350, 260, 316, 344, 334; 370/478, 331, 370/337, 328, 343, 345, 347, 500, 503
See application file for complete search history.

(56) References Cited

U.S. PATENT DOCUMENTS 6,181,952 B1 * 1/2001 Murata ....................... 455/552.1
6,363,260 B1 * 3/2002 Achour et al. ............. 455/553.1

(Continued)

FOREIGN PATENT DOCUMENTS

| | | |
|---|---|---|
| JP | 11-346383 A | 12/1999 |
| JP | 2005-072749 A | 3/2005 |
| WO | WO 2005/117279 A1 | 12/2005 |
| WO | WO 2005/122414 A1 | 12/2005 |

OTHER PUBLICATIONS

International Search Report for Application No. PCT/JP2006/318926, dated Oct. 24, 2006.

(Continued)

*Primary Examiner* — Edward Urban
*Assistant Examiner* — Golam Sorowar
(74) *Attorney, Agent, or Firm* — RatnerPrestia

(57) ABSTRACT

A multimode wireless communication apparatus that supports plural wireless communication systems and switches wireless communication systems to communicate. The apparatus includes a signal processor capable of switching wireless communication systems by plural manners; and a controller that directs to the signal processor a combination of manners of switching wireless communication systems according to a communication environment. The signal processor switches wireless communication systems according to the combination of manners of switching wireless communication systems directed from the controller.

17 Claims, 11 Drawing Sheets

U.S. PATENT DOCUMENTS

| | | | |
|---|---|---|---|
| 6,957,068 B2 * | 10/2005 | Hutchison et al. | 455/435.2 |
| 2002/0031106 A1 * | 3/2002 | Maki et al. | 370/337 |
| 2003/0100307 A1 * | 5/2003 | Wolochow et al. | 455/440 |
| 2003/0219035 A1 * | 11/2003 | Schmidt | 370/478 |
| 2004/0018853 A1 * | 1/2004 | Lewis | 455/552.1 |
| 2004/0037366 A1 * | 2/2004 | Crawford | 375/295 |
| 2005/0282579 A1 * | 12/2005 | Kim | 455/552.1 |
| 2005/0288024 A1 * | 12/2005 | Song | 455/441 |

OTHER PUBLICATIONS

J. Mitola, "The Software Radio Architecture," IEEE Communications Magazine, May, 1995, vol. 33, No. 5, pp. 26-38.

* cited by examiner

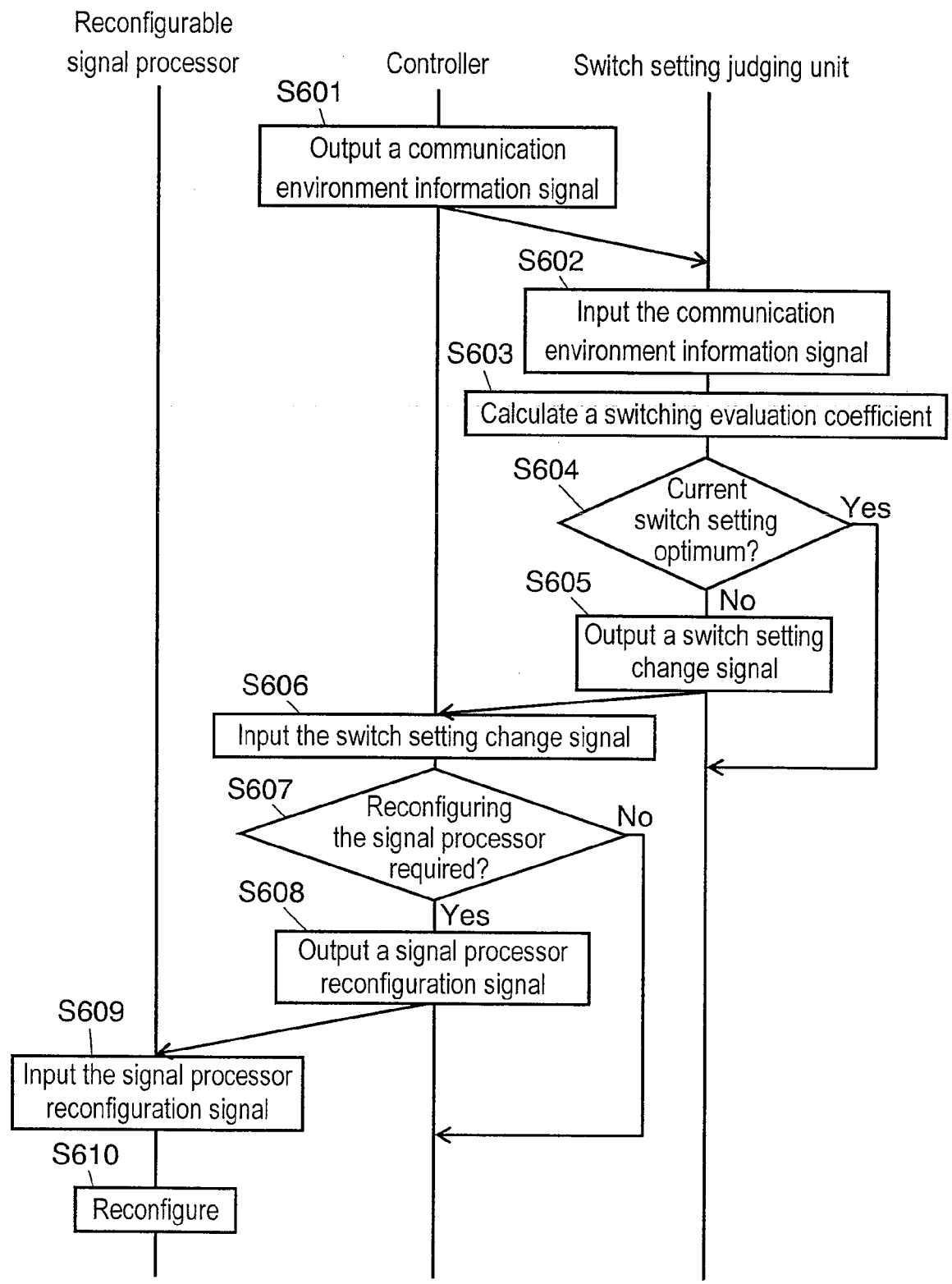

FIG. 7

| Switching power $wch_{i,k}$ | | | |
|---|---|---|---|
| Switch setting k | Wireless communication systems to be switched | | |
| | First ←→ Second (i=1) | Second ←→ Third (i=2) | First ←→ Third (i=3) |
| <1-2-3>(k=1) | 1 | 1 | 1 |
| <1-2>-<3>(k=2) | 1 | 5 | 5 |
| <2-3>-<1>(k=3) | 5 | 1 | 5 |
| <1-3>-<2>(k=4) | 5 | 5 | 1 |
| <1>-<2>-<3>(k=5) | 5 | 5 | 5 |

FIG. 8

| Power consumption $wco_{j,k}$ | | | |
|---|---|---|---|
| Switch setting k | Wireless communication system | | |
| | First communication system (j=1) | Second communication system (j=2) | Third communication system (j=3) |
| <1-2-3>(k=1) | 1 | 1 | 1 |
| <1-2>-<3>(k=2) | 0.7 | 0.7 | 0.4 |
| <2-3>-<1>(k=3) | 0.4 | 0.7 | 0.7 |
| <1-3>-<2>(k=4) | 0.7 | 0.4 | 0.7 |
| <1>-<2>-<3>(k=5) | 0.4 | 0.4 | 0.4 |

FIG. 9

| Wireless communication system i to be switched | Times of switching $r_i$ |
|---|---|
| First ←→ Second (i=1) | 270 |
| Second ←→ Third (i=2) | 10 |
| First ←→ Third (i=3) | 20 |

FIG. 10

| Wireless communication system j | Communication duration time $t_j$ |
|---|---|
| First (j=1) | 290 |
| Second (j=2) | 280 |
| First (j=3) | 30 |

FIG. 11

| Switch setting k | Switching evaluation coefficient $P_k$ |
|---|---|
| <1-2-3>(k=1) | 900 |
| <1-2>-<3>(k=2) | 831 |
| <2-3>-<1>(k=3) | 1793 |
| <1-3>-<2>(k=4) | 1756 |
| <1>-<2>-<3>(k=5) | 1740 |

| Location | Switch setting |
|---|---|
| A | <1-2-3> |
| B | <1-2>-<3> |
| C | <2-3>-<1> |
| D | <1-3>-<2> |
| E | <1>-<2>-<3> |

| Time point | Switch setting |
|---|---|
| A | <1-2-3> |
| B | <1-2>-<3> |
| C | <2-3>-<1> |
| D | <1-3>-<2> |
| E | <1>-<2>-<3> |

MULTIMODE WIRELESS COMMUNICATION APPARATUS AND WIRELESS COMMUNICATION METHOD

THIS APPLICATION IS A U.S. NATIONAL PHASE APPLICATION OF PCT INTERNATIONAL APPLICATION PCT/JP2006/318926.

TECHNICAL FIELD

The present invention relates to a multimode wireless communication apparatus and wireless communication method supporting plural wireless communication systems.

BACKGROUND ART

With the development of wireless communication technologies, various wireless communication systems are in practical use. Consequently, multimode wireless communication apparatuses (multimode wireless terminals) supporting these wireless communication systems are demanded.

Such terminals include a software wireless terminal that has a signal processor composed of a programmable device reconfigurable by rewriting software for such as an FPGA (field programmable gate array) or reconfigurable processor and supports each wireless communication system by reconfiguring the signal processor. Refer to J. Mitola, "*The Software Radio Architecture*" *IEEE Communications Magazine,* 1995, Vol. 33, No. 5, pp. 26-38, for example.

The software wireless terminal with the programmable device is fed configuration data including a circuit configuration, to reconfigure the signal processor every time wireless communication systems are switched. Consequently, the software wireless terminal, with a high frequency of switching wireless communication systems, requires a long time for reconfiguration, thus decreases its communication efficiency.

Another type of software wireless terminal is known that has a different function processor for implementing different functions depending on a wireless communication system and a common function processor for implementing common functions common to each wireless communication system, and supports each wireless communication system by implementing specific functions of the different function processor and common functions of the common function processor. Refer to Japanese Patent Unexamined Publication No. H11-346383, for example.

The software wireless terminal having the different function processor and common function processor is fed a parameter (difference information) corresponding to a wireless communication system to specify the functions, and thus wireless communication systems can be switched faster than the case where a signal processor is reconfigured. However, the software wireless terminal, including a redundant general-purpose circuit supporting plural wireless communication systems, consumes more power than that including a circuit supporting a single wireless communication system.

To sum up, manners of switching wireless communication systems in a software wireless terminal include reconfiguring the signal processor and specifying the functions by parameter input. With a low frequency of switching wireless communication systems, reconfiguring the signal processor has an advantage in power consumption. With a high frequency, specifying the functions by parameter input has an advantage in communication efficiency.

However, in a conventional software wireless terminal, its manner of switching wireless communication systems is fixed. Although an optimum manner of switching wireless communication systems is different depending on an operation environment, a conventional software wireless terminal has difficulty in switching wireless communication systems according to an operation environment.

SUMMARY OF THE INVENTION

To solve the above-described conventional problems, the present invention provides a multimode wireless communication apparatus and wireless communication method that allows its manner of switching wireless communication systems to be switched or selected automatically according to an operation environment.

A multimode wireless communication apparatus of the present invention supports plural wireless communication systems and communicates with its wireless communication systems switched. The apparatus includes a signal processor capable of switching wireless communication systems by plural manners; and a controller directing to the signal processor a combination of manners of switching wireless communication systems according to a communication environment, where the signal processor switches wireless communication systems according to the combination of manners of switching wireless communication systems directed by the controller.

This configuration allows an optimum wireless communication system to be selected automatically according to an operation environment.

The signal processor may switch wireless communication systems either by reconfiguring the circuit or by switching the function through inputting parameters according to the wireless communication system.

Such configuration further allows switching wireless communication systems by specifying functions through inputting parameters or reconfiguring the circuit.

The multimode wireless communication apparatus may include an information storing unit storing configuration information used for reconfiguring the signal processor, and the signal processor may switch the functions by inputting parameters from the controller and at the same time may reconfigure by inputting configuration information from the configuration information storing unit.

Such configuration allows implementing more practical configuration.

The apparatus may include a switch setting judging unit judging the combination of switching wireless communication systems according to the communication environment.

Such configuration further allows judging an optimum combination of switching manners with any timing, regardless of timing for switching wireless communication systems.

The switch setting judging unit may further judge a combination of switching wireless communication systems according to the communication environment on the basis of communication environment information and a switch setting judgement coefficient obtained from the controller.

Such configuration further allows judging an optimum combination of manners of switching wireless communication systems using communication environment information and the switch setting judgement coefficient as the communication environment.

The switch setting judgement coefficient may further include power required for switching wireless communication systems in the combination and that per unit time.

Such configuration allows determining a more appropriate combination of switching manners.

The switch setting judging unit may further calculate a switching evaluation coefficient using communication environment information and the switch setting judgement coefficient and determine a combination with the smallest power required during a predetermined period as the combination of manners of switching wireless communication systems according to the communication environment.

Such configuration further allows determining a combination of switching manners suppressing power consumption.

The apparatus may further include a judgement information storing unit storing the switch setting judgement coefficient.

Such configuration further allows storing the switch setting judgement coefficient within the apparatus.

The communication environment information may include times of switching wireless communication systems per unit time and a communication duration time by each wireless communication system.

Such configuration further allows determining a more appropriate combination of switching manners.

The switch setting judging unit may judge the combination of manners of switching wireless communication systems according to the communication environment on the basis of location information and location-to-switch setting correspondence information.

Such configuration further allows automatically selecting an optimum manner of switching wireless communication systems on the basis of location information.

The apparatus may further include a location information acquiring unit acquiring location information, and the location information may include information related to the location of the apparatus.

Such configuration further allows determining a more appropriate combination of switching manners conforming to the own location.

The location-to-switch setting correspondence information may further include information on an optimum combination at each location of the multimode wireless communication apparatus.

Such configuration further allows determining the optimum combination at each location of the apparatus.

The switch setting judging unit may further determine the optimum combination at the current location of the multimode wireless communication apparatus using location information and location-to-switch setting correspondence information.

Such configuration further allows determining an optimum combination at the current location of the apparatus.

The apparatus may further include a judgement information storing unit storing location-to-switch setting correspondence information.

Such configuration further allows storing location-to-switch setting correspondence information within the apparatus.

The switch setting judging unit may further judge the combination of manners of switching wireless communication systems according to the communication environment on the basis of time point information and time point-to-switch setting correspondence information.

Such configuration further allows automatically selecting an optimum manner of switching wireless communication systems on the basis of time point information.

The point-to-switch setting correspondence information may further include information on an optimum combination at each time point.

Such configuration further allows determining the optimum combination at each time point.

The apparatus may further include a time point information acquiring unit acquiring time point information, where the time point information may include information related to a current time point.

Such configuration further allows determining an optimum combination at the current time point.

The switch setting judging unit may further determine an optimum combination at the current time point using time point information and time point-to-switch setting correspondence information.

Such configuration further allows determining the optimum combination according to the current time point.

The apparatus may further include a judgement information storing unit storing time point-to-switch setting correspondence information.

Such configuration further allows storing time point-to-switch setting correspondence information within the apparatus.

The signal processor may further request the controller to switch wireless communication systems.

Such configuration further allows switching wireless communication systems on the basis of an extraneous signal from such as another wireless terminal.

The switch setting judging unit may further determine the combination at least either periodically or when the signal processor requests the controller to switch wireless communication systems.

Such configuration further allows automatically switching wireless communication systems with more appropriate timing.

The controller may further direct to the signal processor reconfiguration (not involving switching wireless communication system) of the signal processor on the basis of the combination, and then the signal processor may reconfigure the circuit.

This configuration further allows optimizing the combination of switching manners regardless of timing of switching wireless communication systems.

Next, the multimode wireless communication method of the present invention is that using a multimode wireless communication apparatus supporting plural wireless communication systems and including a signal processor capable of switching wireless communication systems by plural manners. The multimode wireless communication manner is characterized by a first step that directs to the signal processor a combination of manners of switching wireless communication systems according to a communication environment; and a second step that switches wireless communication systems according to the combination of manners of switching wireless communication systems, directed at the first step.

Such a manner allows automatically selecting an optimum manner of switching wireless communication systems according to a communication environment.

As described above, according to the multimode wireless apparatus and wireless communication method of the present invention, in a wireless network system including a multimode wireless terminal supporting plural different wireless communication systems, and plural wireless terminals each supporting a different wireless communication system, a multimode wireless terminal, when communicating with another wireless terminal with the corresponding wireless communication systems switched, can determine a combination of manners of switching wireless communication systems according to an operation environment and automatically select a manner of switching wireless communication systems.

BRIEF DESCRIPTION OF DRAWINGS

FIG. 6 illustrates an operation procedure for changing switch settings in the multimode wireless terminal of the first embodiment of the present invention.

FIG. 7 shows an example of switching power of the multimode wireless terminal of the first embodiment of the present invention.

FIG. 8 shows an example of power consumption in the multimode wireless terminal of the first embodiment of the present invention.

FIG. 9 shows an example of switching times in the multimode wireless terminal of the first embodiment of the present invention.

FIG. 10 shows an example of communication duration time in the multimode wireless terminal of the first embodiment of the present invention.

FIG. 11 shows an example of switching evaluation coefficients in the multimode wireless terminal of the first embodiment of the present invention.

REFERENCE MARKS IN THE DRAWINGS

Figure 1:
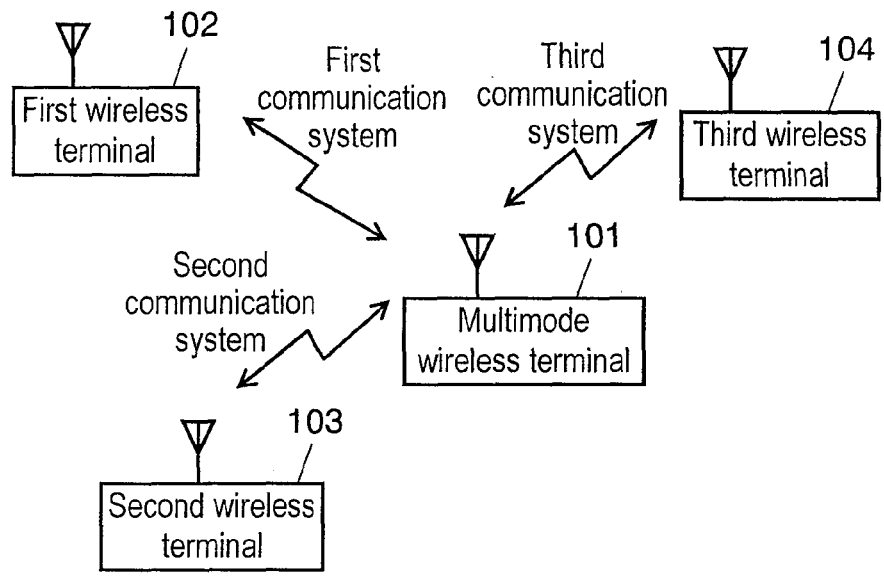
FIG. 1 is a planar layout of a wireless network system including multimode wireless terminals according to the first exemplary embodiment of the present invention.

| Reference marks in the drawings | |
|---|---|
| 101, 1201, 1501 | Multimode wireless terminal |
| 201 | Reconfigurable signal processor (signal processor) |
| 202 | Controller |
| 203 | Switch setting judging unit |
| 204 | Judgement information storing unit |
| 205 | Configuration information storing unit |
| 1202 | Location information acquiring unit |
| 1502 | Time point information acquiring unit |

DETAILED DESCRIPTION OF PREFERRED EMBODIMENTS

First Exemplary Embodiment

The multimode wireless terminal of the first exemplary embodiment of the present invention selects a manner of switching wireless communication systems according to an environment on the basis of times of switching wireless communication systems and communication duration time by each wireless communication system.

FIG. 1 is a planar layout of a wireless network system including multimode wireless terminals according to the first embodiment of the present invention. This network system includes multimode wireless terminal 101 supporting all the wireless communication systems first through third; first wireless terminal 102 supporting the first wireless communication system; second wireless terminal 103 supporting the second wireless communication system; and third wireless terminal 104 supporting the third wireless communication system. Multimode wireless terminal 101 switches corresponding wireless communication systems to communicate with another wireless terminal. In multimode wireless terminal 101, communication duration time by each wireless communication system or the frequency of switching to each wireless communication system is not uniform.

In such a network system, multimode wireless terminal 101 can switch wireless communication systems by appropriately selecting a manner of reconfiguring the signal processor according to an operation environment or a manner of specifying functions by parameter input.

Figure 2:
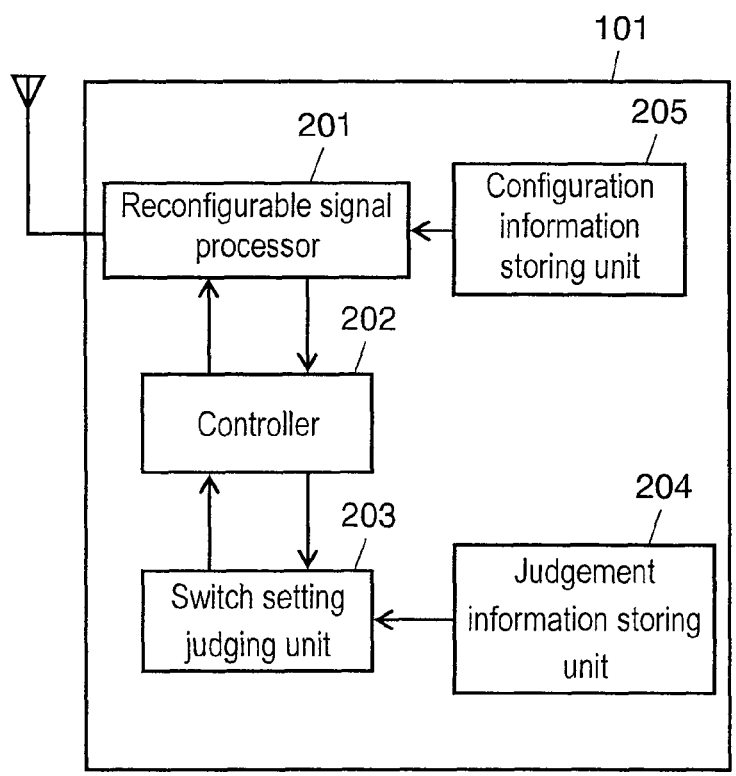
FIG. 2 illustrates configuration of the multimode wireless terminal of the first embodiment of the present invention.

FIG. 2 illustrates the configuration of the multimode wireless terminal of the first embodiment. Multimode wireless terminal 101 includes reconfigurable signal processor 201; controller 202; switch setting judging unit 203; judgement information storing unit 204; and configuration information storing unit 205.

Reconfigurable signal processor 201 has an antenna supporting all the wireless communication systems first through third. Reconfigurable signal processor 201 is composed of one of the following devices or of a combination of them: a programmable device reconfigurable by rewriting software; and a device with its function and operation changeable by inputting a software program or configuration data for such as an FPGA or reconfigurable processor. This configuration allows single reconfigurable signal processor 201 to support one of the wireless communication systems first to third to communicate with another wireless terminal supporting the relevant wireless communication system.

Reconfigurable signal processor 201 outputs to controller 202 a signal requesting for switching wireless communication systems. Then, a parameter switching signal and signal processor reconfiguration signal are inputted from controller 202. A configuration information signal is inputted from configuration information storing unit 205.

Controller 202 controls switching wireless communication systems in reconfigurable signal processor 201 and reconfiguration not involving switching wireless communication systems. For this purpose, controller 202 identifies the configuration of reconfigurable signal processor 201. Controller 202 outputs to reconfigurable signal processor 201 a parameter switching signal and signal processor reconfiguration signal. Controller 202 inputs a switching request signal output from reconfigurable signal processor 201. Controller 202 further outputs a communication environment information signal to switch setting judging unit 203. The communication environment information signal includes information on times of switching wireless communication systems and communication duration time by each wireless communication system.

Switch setting judging unit 203 determines the most efficient combination (referred to as "switch setting," hereinafter) of wireless communication systems in the current communication environment, using a communication environment information signal fed from controller 202 and a switch setting judgement coefficient signal fed from judgement information storing unit 204. If the switch setting is different from the current one, unit 203 outputs a switch setting change signal to controller 202.

Judgement information storing unit 204 retains a switch setting judgement coefficient used by switch setting judging unit 203.

Configuration information storing unit 205 retains configuration information required for reconfiguring reconfigurable signal processor 201.

In the first embodiment, the first wireless communication system is cellular, where DS-CDMA (direct sequence code division multiple access) is used in its wireless communication process. The second one is of wireless LAN (local area network), where OFDM (orthogonal frequency division multiplex) is used for its wireless communication process. The third one is of PAN (personal area network), where DSSS (direct sequence spread spectrum) is used in its wireless communication process.

In the first embodiment, IQ mapper process and filtering are used in all the wireless communication systems first through third. IQ mapper process is different in bit width of input data and in size of LUTs (lookup table); filtering is different in the number of filter taps and filter tap coefficient, depending on a wireless communication system. Viterbi decoding is used in the first and second wireless communication systems, where the coding rate is different depending on a wireless communication system. Correlating is used in the first and third wireless communication systems, where the diffusion rate is different depending on a wireless communication system. Rake reception and FFT process are independently used in the first and second wireless communication systems, respectively.

A description is made for the manner of switching wireless communication systems. Switching by parameter input is performed by preliminarily configuring reconfigurable signal processor 201 into a versatile, comprehensive one, namely supporting plural wireless communication systems, where required parts and coefficients from among the configuration are used according to a parameter switching signal from controller 202.

Meanwhile, switching by reconfiguration is performed by reading configuration information (e.g. configuration data in an FPGA device) of reconfigurable signal processor 201 supporting a desired wireless communication system, from configuration information storing unit 205, where reconfigurable signal processor 201 is reconfigured on the basis of the configuration information.

Figure 3:
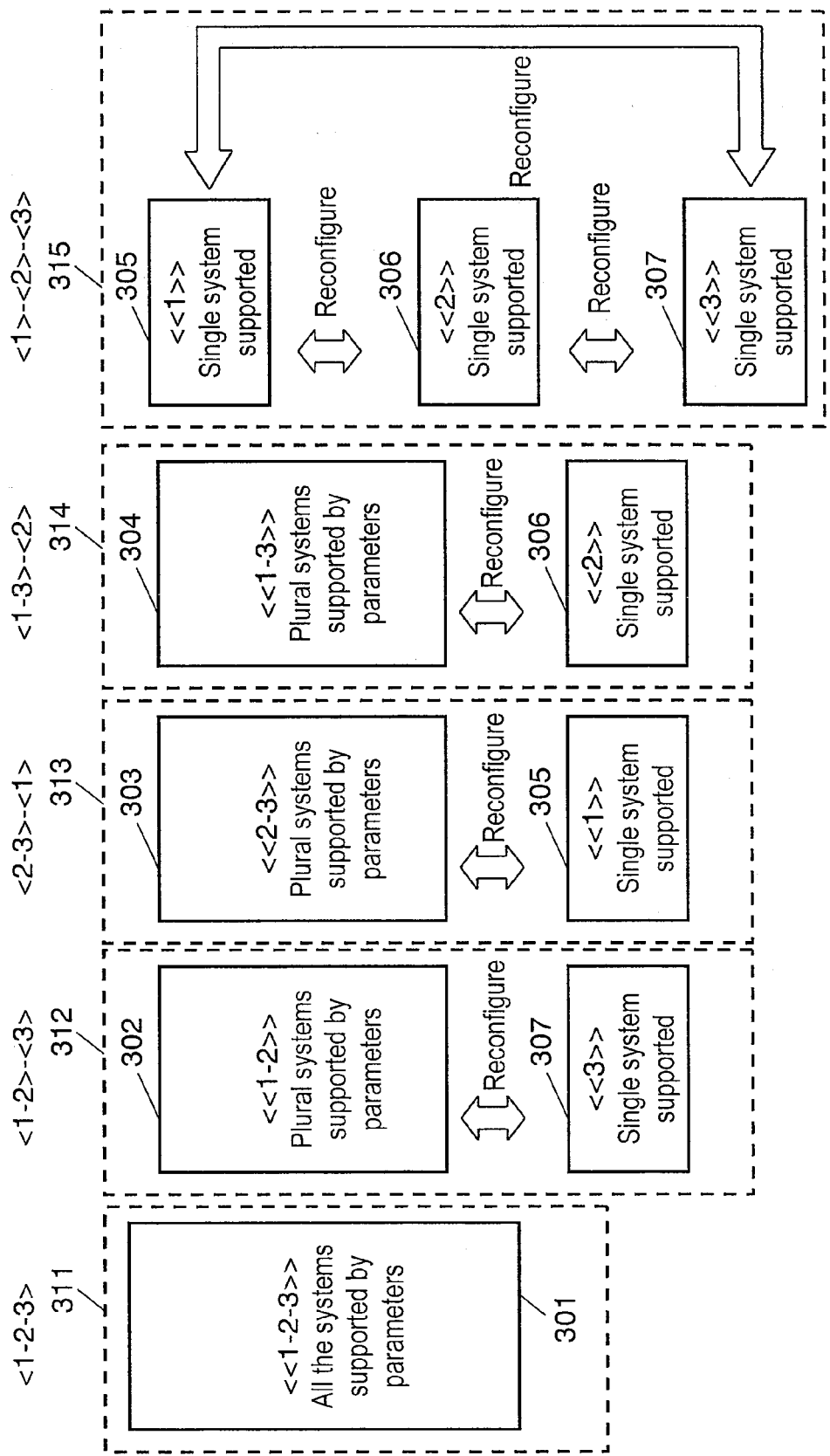
FIG. 3 illustrates configuration of the reconfigurable signal processor of the multimode wireless terminal of the first embodiment of the present invention.

FIG. 3 illustrates the configuration of the reconfigurable signal processor of the multimode wireless terminal of the first embodiment.

Reconfigurable signal processor 201 supports the three wireless communication systems first through third. For this purpose, reconfigurable signal processor 201 has seven possible configurations shown by the solid-line boxes in FIG. 3. That is to say, inputting parameters switches the configuration to one of the following: configuration 301 supporting all the wireless communication systems; 302, first and second; 303, second and third; 304, first and third; 305, only first; 306, only second; and 307, only third.

In FIG. 3, a wireless communication system switched by parameter input is expressed with <<x-y-z>> for configurations 301 through 307. For example, configuration 302, for switching the first and second wireless communication systems by parameter input, is expressed with <<1-2>>. Configuration 307, supporting only the third wireless communication system is <<3>>. To change configuration 302 to 307, reconfigurable signal processor 201 is reconfigured.

Reconfigurable signal processor 201 has five possible switch settings shown by the broken-line boxes in FIG. 3. They are switch setting 311, where switching between all the wireless communication systems is performed by parameter input; switch setting 312, where switching between the first and second wireless communication systems is performed by parameter input, and switching between the first and third, and second and third are performed by reconfiguration; switch setting 313, where switching between the second and third, by parameter input, and first and second, and first and third, by reconfiguration; switch setting 314, where switching between the first and third, by parameter input, and first and second, and second and third, by reconfiguration; and switch setting 315, between all the wireless communication systems, by reconfiguration.

In FIG. 3, switching by parameter input and switching by reconfiguration are expressed by <1-2>-<3>, for example, for each switch setting. This means switching between the first and second wireless communication systems (included in the first pair of brackets) is performed by parameter input, and switching between the first and third wireless communication systems or the second and third (not included in the second pair of brackets) is performed by reconfiguration.

To switch wireless communication systems by parameter input, reconfigurable signal processor 201 processes as follows. That is, in IQ mapper process, processor 201 preliminarily prepares a circuit configuration supporting a wireless communication system with input data largest in its bit width and LUT size, and activates a required circuit with a required input bit width and LUT size specified by parameter input. In filtering, processor 201 preliminarily prepares filter taps by the number supporting a wireless communication system with the most filter taps, and filter tap coefficients corresponding to each wireless communication system, and activates a required circuit with a required number of filter taps and filter tap coefficients specified by parameter input.

Figure 4:
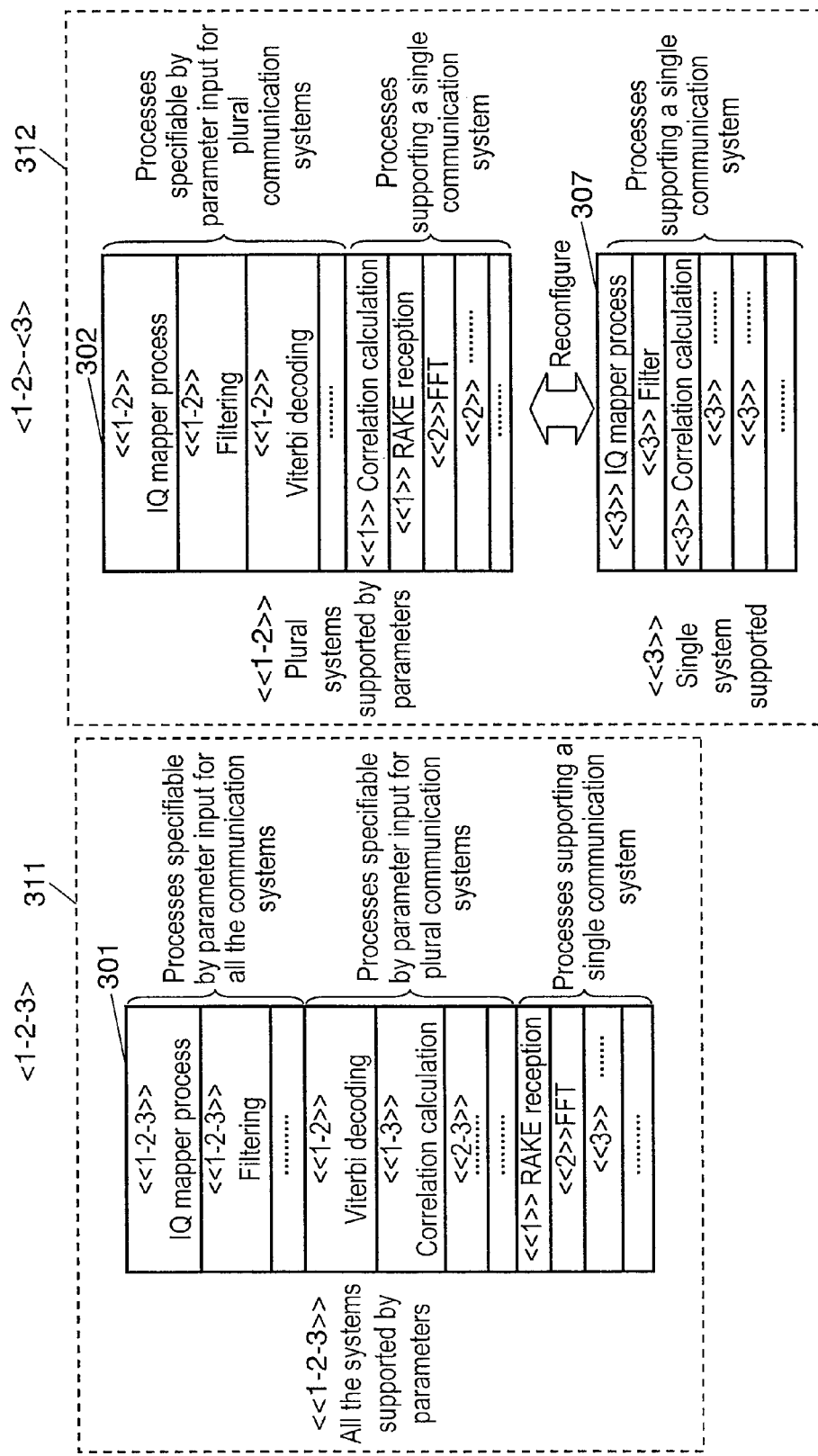
FIG. 4 illustrates a concrete configuration of the reconfigurable signal processor of the multimode wireless terminal of the first embodiment of the present invention.

FIG. 4 illustrates a concrete configuration of the reconfigurable signal processor of the multimode wireless terminal of the first embodiment of the present invention, namely configurations 301, 302, 307 with switch settings 311, 312.

In configuration 301, where switching between all the wireless communication systems is performed by parameter input, a versatile circuit is prepared so as to support most possible wireless communication systems for processes used in all the wireless communication systems (e.g. IQ mapper process, filtering) and those used in some wireless communication systems (e.g. Viterbi decoding, correlation operation). In configuration 301, circuits required for all the processes are prepared so as to support all the wireless communication systems for processes used only in a single wireless communication system (e.g. Rake reception, FFT process).

Meanwhile, in configuration 302, where switching between the first and second wireless communication systems is performed by parameter input, processes supporting the third wireless communication system are not required for processes used in all the wireless communication systems and those used for some, thereby reducing the redundancy to downsize the circuit. Configuration 302 dispenses with processes used for the third wireless communication system for processes used only in a single wireless communication system, thus further downsizing the circuit.

Configuration 307, supporting only the third wireless communication system, needs to support only the third wireless communication system for processes used in all the wireless communication systems and those used in some, thereby reducing the redundancy to further downsize the circuit. Configuration 307 dispenses with processes used in the first and second wireless communication systems, and only the first or second one, thus further downsizing the circuit.

Here, in processes (processes with the same number of taps and different tap coefficients in such as filtering or correlation operation) using the same circuit, with different coefficients depending on a wireless communication system, switching (changing only a coefficient) by parameter input is suitable. In processes (e.g. a process using required circuits out of the maximum number of circuits prepared) using different circuits with such as different numbers of taps or different processing bit widths, either switching by parameter input or that by reconfiguration is suitable depending on the ratio of an overlapped part. In processes with different circuits themselves, switching by reconfiguration is suitable.

Multimode wireless terminal 101 communicates by the first and second wireless communication systems for a short time at a time and switches between the wireless communication systems frequently. Meanwhile, terminal 101 communicates by the third wireless communication system for a long time at a time and seldom switches between the other wireless communication systems.

When multimode wireless terminal 101 communicates with first wireless terminal 102, second wireless terminal 103, and third wireless terminal 104, by each corresponding wireless communication system in the above-described configuration in the network system, hereinafter a description is made for the operation of determining a switching setting according to an operation environment and automatically selecting an optimum manner of switching wireless communication systems.

Figure 5:
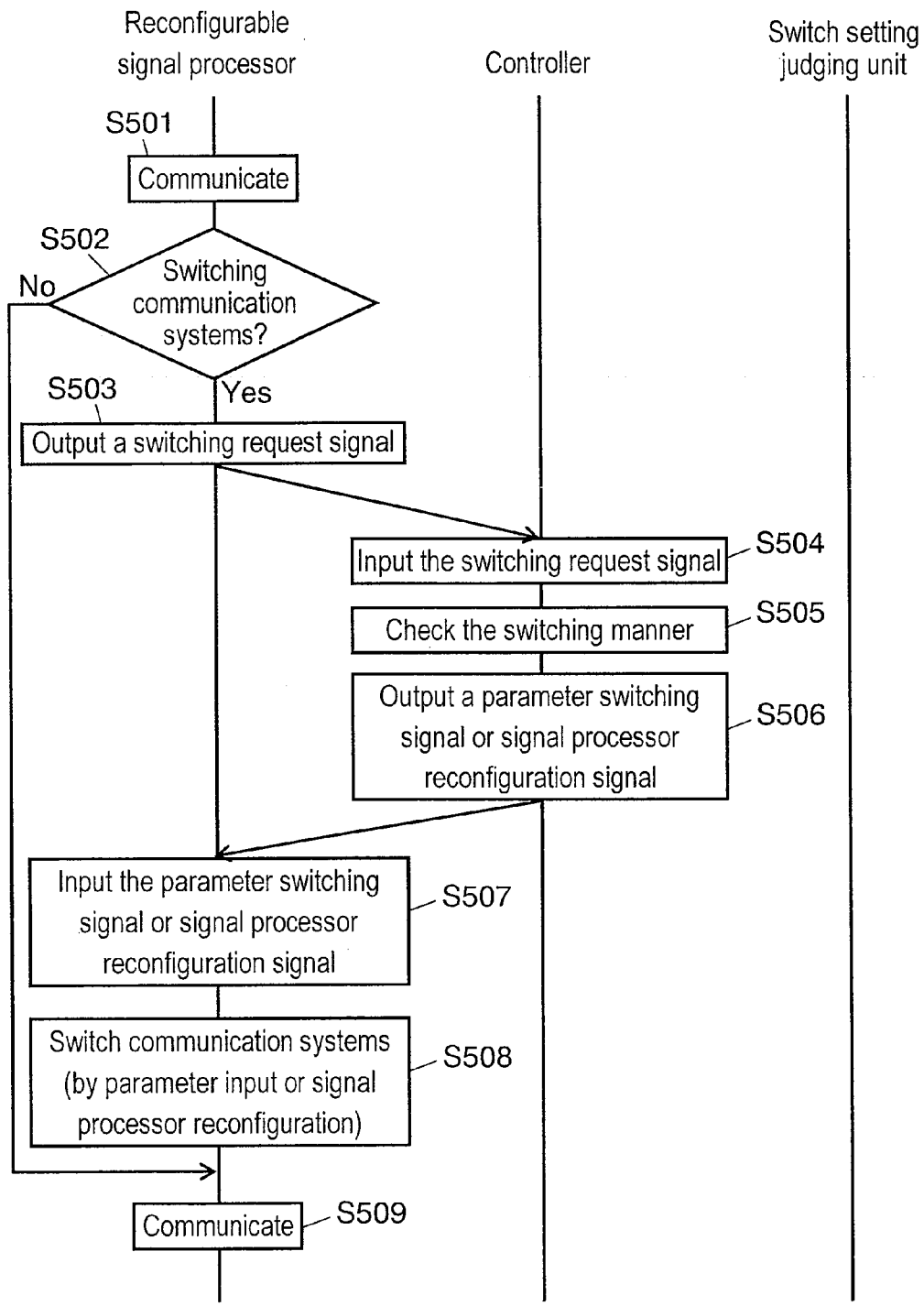
FIG. 5 illustrates an operation procedure for switching wireless communication systems in the multimode wireless terminal of the first embodiment of the present invention.

FIG. 5 illustrates an operation procedure for switching wireless communication systems in the multimode wireless terminal of the first embodiment. Switching wireless communication systems is performed by reconfigurable signal processor 201 and controller 202.

In the first embodiment, as the initial state of multimode wireless terminal 101, the switch setting is assumed to be switch setting 311 of <1-2-3>, where switching between the first, second, and third wireless communication systems is performed by parameter input, and the configuration of reconfigurable signal processor 201 is assumed to be configuration 301 of <<1-2-3>>, where switching between the first, second, and the third wireless communication systems is performed by parameter input.

Reconfigurable signal processor 201 switches wireless communication systems by parameter input to communicate with another wireless terminal (step S501). To switch wireless communication systems (Yes at step S502), reconfigurable signal processor 201 outputs a switching request signal to controller 202 (step S503). To switch from the first wireless communication system to the second, the switching request signal includes information for specifying the first wireless communication system before switching and the second one after switching.

Controller 202 judges how switching indicated in the switching request signal fed (step S504) from reconfigurable signal processor 201 is performed, by parameter input or by reconfiguration (step S505). If judged as parameter input, controller 202 outputs a parameter switching signal to reconfigurable signal processor 201; if as reconfiguration, a signal processor reconfiguration signal. In the first embodiment, where the initial state of the multimode wireless terminal is switch setting 311 of <1-2-3>, switching from the first wireless communication system to the second, indicated in the switching request signal, is judged as performed by parameter input. Thus, a parameter switching signal is output to reconfigurable signal processor 201 so that switching from the first wireless communication system to the second is performed by parameter input (step S506).

Here, the parameter switching signal includes information on wireless communication systems before and after switching; information (e.g. IQ mapper process, filtering, Viterbi decoding process, FFT process) for specifying processes required for the wireless communication system after switching in reconfigurable signal processor 201; and information (e.g. bit width of input data, size of LUT for IQ mapper process; the number of filter taps, filter tap coefficient for filtering) for specifying details of each process.

When a parameter switching signal is fed from controller 202 (step S507), reconfigurable signal processor 201, switches wireless communication systems with specifying processes and their details required for a wireless communication system after switching according to the parameter switching signal (step S508), to communicate with another wireless terminal (step S509). When a signal processor reconfiguration signal is fed (step S507), processor 201 is fed configuration information from configuration information storing unit 205 according to the signal processor reconfiguration signal, and switches wireless communication systems after reconfiguring reconfigurable signal processor 201 (step S508), to communicate with another wireless terminal (step S509).

FIG. 6 illustrates an operation procedure for changing the switch setting in the multimode wireless terminal of the first embodiment. The switching setting is changed by reconfigurable signal processor 201, controller 202, and switch setting judging unit 203.

Controller 202 outputs a communication environment information signal to switch setting judging unit 203 periodically (step S601). The communication environment information includes times of switching wireless communication systems per unit time and communication duration time in each wireless communication system.

Switch setting judging unit 203 is fed a communication environment information signal from controller 202 (step S602), and then calculates a switching evaluation coefficient to determine an optimum switch setting (step S603).

In the first embodiment, elements for judging a switch setting include, besides communication environment information, switching power required for switching wireless communication systems in each switch setting and power consumption during communication by each wireless communication system. The switching power and power consumption are preliminarily retained by judgement information storing unit 204 as a switch setting judgement coefficient, which can be derived from the size of a circuit used in each wireless communication system or the amount of processing signals in each wireless communication system.

FIG. 7 shows an example of switching power for the multimode wireless terminal of the first embodiment. FIG. 8 shows an example of power consumption in the multimode wireless terminal of the first embodiment. In FIG. 7, "x←→y" indicates wireless communication systems before and after switching. For example, "first←→second" indicates switching between the first and second wireless communication systems.

Switch setting judging unit 203 calculates switching evaluation coefficient $P_k$ from a switch setting judgement coefficient, expression (1) shown below, and communication environment information, to judge a switch setting with the smallest switching evaluation coefficient $P_k$ as an optimum one.

$$P_k = \sum_i r_i wch_{i,k} + \sum_j t_j wco_{j,k} \qquad (1)$$

Here, "k" is a variable representing a setting of switching wireless communication systems, assuming a value 1 to 5. "i" is a variable representing a combination of wireless communication systems before and after switching, assuming a value 1 to 3. "j" is a variable representing a wireless communication system, assuming a value 1 to 3. "$r_i$" represents times of switching for i (a combination of wireless communication systems) in a certain unit time; "$wch_{i,k}$", switching power in switch setting k with a wireless communication system combination i; "$t_j$", communication duration time by wireless communication system j; "$wco_{j,k}$", power consumption per unit time in switch setting k by wireless communication system j.

Switching evaluation coefficient $P_k$ represents power required for switching wireless communication systems and for communication in each switch setting; selecting a switch setting with the smallest $P_k$ reduces the power consumption.

FIG. 9 shows an example of switching times in the multimode wireless terminal of the first embodiment. FIG. 10 shows an example of communication duration time in the multimode wireless terminal of the first embodiment. FIG. 11 shows an example of switching evaluation coefficients in the multimode wireless terminal of the first embodiment. Assigning times of switching $r_i$ shown in FIG. 9 and communication duration time $t_j$ shown in FIG. 10 to formula (1) provides switching evaluation coefficient $P_k$ shown in FIG. 11.

In the first embodiment, judgement is made that switch setting 312 of <1-2>-<3>, where switching between the first and second wireless communication systems is performed by parameter input, and switching between the first and third, and second and third is performed by reconfiguration, provides the smallest switching evaluation coefficient $P_k$ and the lowest power consumption, namely the highest communication efficiency.

In FIG. 6, if the switch setting judged as providing the highest communication efficiency is different from the current switch setting (No at step S604), switch setting judging unit 203 outputs a switch setting change signal to controller 202 so as to change the switch setting of reconfigurable signal processor 201 to the switch setting judged as providing the highest communication efficiency (step S605). The switch setting change signal includes information related to switch setting 311 of <1-2-3> before switching and switch setting 312 of <1-2>-<3> after switching.

Controller 202 is fed a switch setting change signal from switch setting judging unit 203 (step S606); compares the configuration of reconfigurable signal processor 201 in the current switch setting with that in the switch setting after switching indicated in the switch setting change signal, by the current wireless communication system; if different, judges as reconfiguring reconfigurable signal processor 201 is required (Yes at step S607), and outputs a signal processor reconfiguration signal to reconfigurable signal processor 201 (step S608).

In the first embodiment, reconfigurable signal processor 201 is communicating with switch setting 311 of <1-2-3> shown in FIG. 3, in configuration 301 of <<1-2-3>>, by the second wireless communication system. Meanwhile, what is indicated in the switch setting change signal is switch setting 312 of <1-2>-<3> and the configuration for communicating by the second wireless communication system is configuration 302 of <<1-2>>. Controller 202 judges that reconfigurable signal processor 201 needs to be reconfigured from configuration 301 of <<1-2-3>> to configuration 302 of <<1-2>>. Controller 202 outputs a signal processor reconfiguration signal to reconfigurable signal processor 201 so as to reconfigure so.

Even if the current switch setting is different from that indicated in the switch setting change signal, the configuration of reconfigurable signal processor 201 may remain unchanged, thus dispensing with reconfiguration (No at step S607). Configuration 307 with switch setting 312 and switch setting 315 shown in FIG. 3 is an example. In such a case, reconfiguration is performed in accordance with switching wireless communication systems.

According to a signal processor reconfiguration signal input from controller 202 (step S609), reconfigurable signal processor 201, is fed configuration information on configuration 302 of <<1-2>> from configuration information storing unit 205; and reconfigures reconfigurable signal processor 201 from configuration 301 of <<1-2-3>> to configuration 302 of <<1-2>> (step S610). Then, multimode terminal 101 communicates with second wireless terminal 103 by the second wireless communication system.

According to the first embodiment, when multimode wireless terminal 101 communicates with another wireless terminal by switching corresponding wireless communication systems, in an environment where multimode wireless terminal 101 supporting plural different wireless communication systems and plural wireless terminals 102, 103, 104 respectively supporting different wireless communication systems exist, an optimum switching manner can be automatically selected through controlling the switch setting according to the communication environment. Thus, multimode wireless terminal 101 reduces the power consumption.

In the first embodiment, some wireless terminals may exist using the same wireless communication system out of the plural wireless terminals; a wireless terminal may support plural wireless communication systems; plural multimode wireless terminals may exist; and two, or four or more wireless terminals may exist and plural wireless communication systems may be mixed. That is, any environment applies as long as multimode wireless terminal 101 communicates while switching plural wireless communication systems therein.

Multimode wireless terminal 101 may retain in a single storage information stored in judgement information storing unit 204 and configuration information storing unit 205. This reduces the size of multimode wireless terminal 101 itself.

Multimode wireless terminal 101 may further include an output unit outputting information on such as the current wireless communication system, a configuration of reconfigurable signal processor 201, and a manner of switching wireless communication systems. The output unit outputs various information to an external device (e.g. PC, TV set, printer), thus sharing the information therewith. The information can be output as an image or character information, thereby reporting the communication circumstances to the user.

Multimode wireless terminal 101 may further include an input unit inputting an extraneous signal. This enables a manner of switching wireless communication systems and a switch setting judgement coefficient to be directed externally.

Communication environment information may include information on communication quality, received power, power ratio of reception signal to noise, and their fluctuation speeds. This allows selecting a manner of switching wireless communication systems better conforming to the current environment. For example, if these fluctuation speeds are high, wireless communication systems may be switched frequently according to the speeds. Under the circumstances, parameter input is used for switching to reduce the power consumption.

Elements used for judging a switch setting may include location information, communication quality, the degree of sharing circuits between wireless communication systems, and the correlationship of operating time between wireless communication systems. This allows selecting a manner of switching wireless communication systems better conforming to the current environment. For example, if information is provided that shows the simultaneous usage of the first and second wireless communication systems or that of the third and fourth wireless communication systems as the correlationship of operating time between wireless communication systems, the communication duration time by the current wireless communication system enables predicting that by another wireless communication system, thus allowing an appropriate switching manner to be selected more rapidly.

A switch setting may be judged according to the type of a power source to multimode wireless terminal 101. For example, if the power source is exhausted within a relatively short time (e.g. battery), a switch setting with the least power consumption is selected. Meanwhile, if the power source supplies sufficient power, a switch setting using parameter input frequently is selected to reduce time required for switching wireless communication systems, thereby providing efficient communications.

A manner of switching wireless communication systems may be judged on the basis of times of switching, the periodicity and correlation in the distribution of communication duration time, and communication quality (improvement, deterioration). Further, the judgement may be made when reconfigurable signal processor 201 outputs a switching request signal. Alternatively, the judgement may be made on the basis of the histories of a manner of switching wireless communication systems, communication switching request, and communication environment information, preliminarily retained. The judgement may be made on the basis of periodical fluctuations (daytime/nighttime, weekday/holiday, season) in these histories. As the same user may use a different wireless communication system depending on a location or time period, a switch setting and the location/time information then are retained to accommodate their variations. Even if the user uses different wireless communication systems (e.g. the first at home, second on the move, third in an office) with their time ratios different, they are basically periodic, namely repeated daily, weekly, or annually. Thus, if the previous switch settings are retained and the current situation is identified by location/time information, an appropriate manner of switching wireless communication systems can be selected rapidly by accessing the previous switch settings.

A manner of switching wireless communication systems may be judged by a coefficient obtained from the calculation on communication environment information and a switch setting judgement coefficient. Further, a concrete value of a switch setting judgement coefficient may be calculated on the basis of the size and degree of sharing of the circuit for processes required for each wireless communication system.

Configuration information required for reconfiguring reconfigurable signal processor 201 may be downloaded externally. This reduces the storage capacity required for configuration information storing unit 205.

Unused circuit resources may be used for parallel processing to reduce the clock speed or to handle plural processes. Unused circuit resources may be used for enlarging the filter tap coefficient or for increasing the number of taps of the correlation coefficient to improve the communication quality. This reduces the power consumption and improves the operation performance and communication quality.

Second Exemplary Embodiment

A multimode wireless terminal of the second exemplary embodiment selects a manner of switching wireless communication systems conforming to an environment using location information. In the second embodiment, for a configuration and operation same as those of the first embodiment, their description is omitted.

Figures 12, 13:
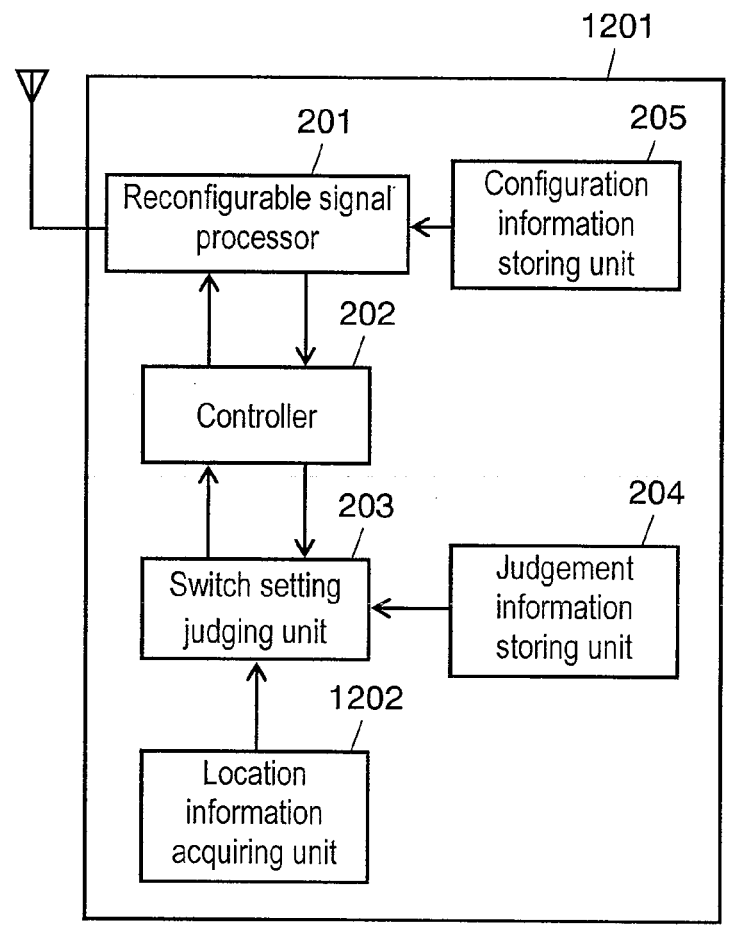
FIG. 12 illustrates configuration of a multimode wireless terminal of the second exemplary embodiment of the present invention.
FIG. 13 shows an example of location-to-switch setting correspondence information in the multimode wireless terminal of the second embodiment of the present invention.

FIG. 12 illustrates the configuration of a multimode wireless terminal of the second embodiment. Multimode wireless terminal 1201 includes reconfigurable signal processor 201, controller 202, switch setting judging unit 203, judgement information storing unit 204, configuration information storing unit 205, and location information acquiring unit 1202.

Switch setting judging unit 203 judges the most efficient switch setting in the current operation environment, using a location information signal fed from location information acquiring unit 1202 and a location-to-switch setting correspondence information signal (indicating relationship between a location and a switch setting) fed from judgement information storing unit 204. If the switch setting judged is different from the current switch setting, unit 203 outputs a switch setting change signal to controller 202.

Judgement information storing unit 204 retains location-to-switch setting correspondence information used by switch setting judging unit 203. The location-to-switch setting correspondence information includes information on an optimum switch setting at each location of multimode wireless terminal 1201.

Location information acquiring unit 1202 acquires location information and outputs a location information signal to switch setting judging unit 203. The location information includes information related to the current location of multimode wireless terminal 1201. To acquire location information, manners can be used such as externally feeding location information; specifying a location using a wireless signal such as that from GPS (the Global Pointing System); or using an identifying signal from a base station.

FIG. 13 shows an example of location-to-switch setting correspondence information in the multimode wireless terminal of the second embodiment. The location information, indicating the location of multimode wireless terminal 1201, has five types: locations A, B, C, D, and E. At location A, switch setting <1-2-3> is used to communicate; at location B, <1-2>-<3>.

In the second embodiment alike, as the initial state of multimode wireless terminal 1201, the switch setting is assumed to be switch setting 311 of <1-2-3>, where switching between the first, second, and third wireless communication systems is performed by parameter input, and the configuration of reconfigurable signal processor 201 is assumed to be configuration 301 of <<1-2-3>>, where switching between the first, second, and the third wireless communication systems is performed by parameter input. Multimode wireless terminal 1201 is assumed to move from location A to location B.

In the above-described configuration, when multimode wireless terminal 1201 communicates with plural wireless terminals by respectively corresponding wireless communication systems in the network system shown in FIG. 1, a description is made for the operation of automatically selecting an optimum manner of switching wireless communication systems with a switch setting determined according to location information. The operation of switching wireless communication systems in multimode wireless terminal 1201 is the same as that shown in FIG. 5.

Figure 14:
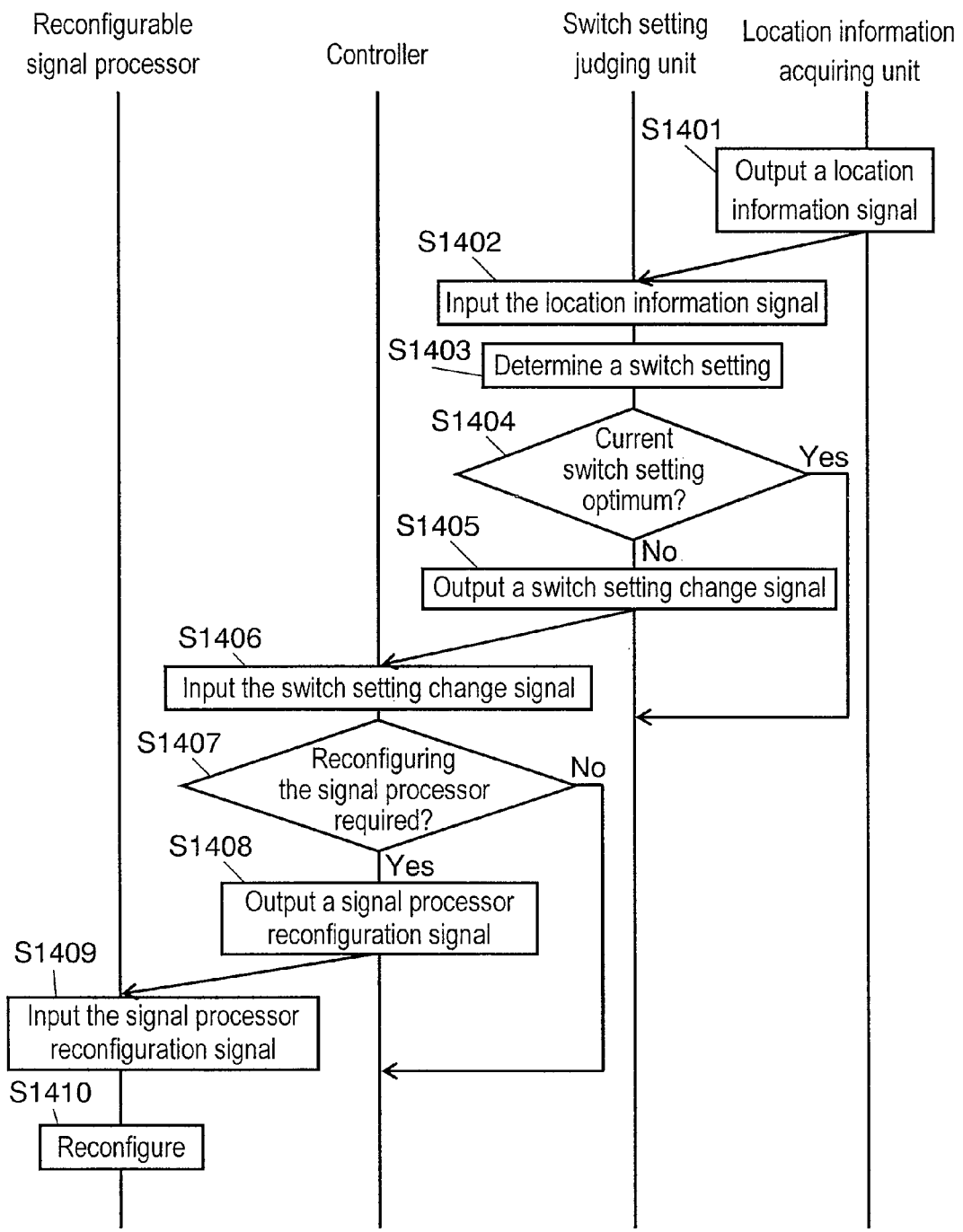
FIG. 14 illustrates an operation procedure for changing switch settings in the multimode wireless terminal of the second embodiment of the present invention.

FIG. 14 illustrates an operation procedure for changing switch settings in the multimode wireless terminal of the second embodiment. Changing switch settings is performed by reconfigurable signal processor 201, controller 202, switch setting judging unit 203, and location information acquiring unit 1202.

Location information acquiring unit 1202 outputs a location information signal to switch setting judging unit 203 periodically (step S1401). The location information includes information related to the location of multimode wireless terminal 1201.

Switch setting judging unit 203 is fed a location information signal from location information acquiring unit 1202 (step S1402) and determines an optimum switch setting of wireless communication systems on the basis of this information (step S1403).

In the second embodiment, the elements used for judging switch setting are location information and location-to-switch setting correspondence information. The location-to-switch setting correspondence information, preliminarily retained by judgement information storing unit 204, is determined by information such as the circumstances of wireless communication systems used at each location, switching frequency, and communication quality, at each location.

When multimode wireless terminal 1201 moves from location A to location B, switch setting judging unit 203 compares current switch setting <1-2-3>, with switch setting <1-2>-<3> at location B included in location-to-switch setting correspondence information (step S1404). Then, unit 203 sends the switch setting <1-2>-<3> as a switch setting change signal to controller 202 (step S1405). The subsequent operation (steps S1406 through S1410) is the same as that shown in FIG. 6 (steps S606 through S610).

According to the second embodiment, when multimode wireless terminal 1201 communicates with another wireless terminal with the corresponding wireless communication systems switched, in an environment including multimode wireless terminal 1201 supporting plural different wireless communication systems, and plural wireless terminals each supporting a different wireless communication system, terminal 1201 can control switch settings according to a location to automatically select an optimum switching manner. Thus, multimode wireless terminal 1201 reduces the power consumption and communicates efficiently.

In the second embodiment, when multimode wireless terminal 1201 moves to a different location included in location-switch setting correspondence information, location information acquiring unit 1202 may output a location information signal to switch setting judging unit 203, and switch setting judging unit 203 may determine a switch setting. Meanwhile, when the user directs externally, or when reconfigurable signal processor 201 outputs a switching request signal, location information acquiring unit 1202 may output a location information signal to switch setting judging unit 203, and switch setting judging unit 203 may determine a switch setting.

Alternatively, reconfigurable signal processor 201 may receive a signal including location information to determine a switch setting according to the location information without using location information acquiring unit 1202.

Third Exemplary Embodiment

A multimode wireless terminal of the third exemplary embodiment selects a manner of switching wireless communication systems conforming to an environment using time point information. In the third embodiment, for a configuration and operation same as those of the multimode wireless terminal according to the first and second embodiments, their descriptions is omitted.

Figures 15, 16:
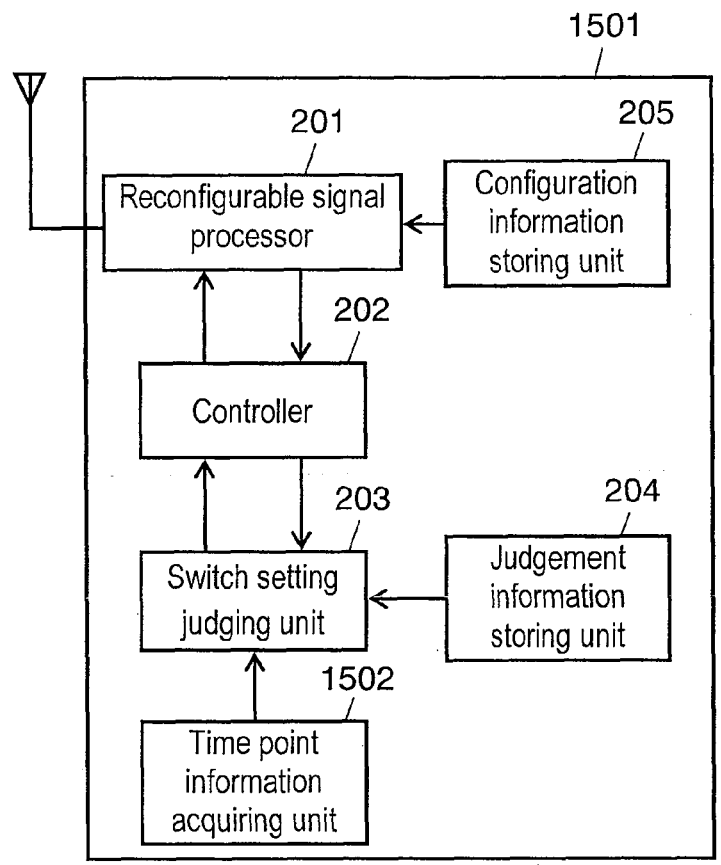
FIG. 15 illustrates configuration of a multimode wireless terminal of the third exemplary embodiment of the present invention.
FIG. 16 shows an example of location-to-switch setting correspondence information in the multimode wireless terminal of the third embodiment of the present invention.

FIG. 15 illustrates configuration of a multimode wireless terminal of the third exemplary embodiment. Multimode wireless terminal 1501 includes reconfigurable signal processor 201, controller 202, switch setting judging unit 203, judgement information storing unit 204, configuration information storing unit 205, location information acquiring unit 1202, and time point information acquiring unit 1502.

Switch setting judging unit 203 uses a time point information signal fed from time point information acquiring unit 1502 and a time point-to-switch setting correspondence information signal indicating relationship between a time point and a switch setting, fed from judgement information storing unit 204, to judge the most efficient switch setting in the current communication environment. If the switch setting is different from the current one, unit 203 outputs a switch setting change signal to controller 202.

Judgement information storing unit 204 retains time point-to-switch setting correspondence information used in switch setting judging unit 203. The time point-to-switch setting correspondence information includes information on an optimum switch setting at each time point for multimode wireless terminal 1501.

Time point information acquiring unit 1502 acquires time point information to output a time point information signal to switch setting judging unit 203. The time point information includes information related to the current time point. To acquire time point information, manners can be used such as externally inputting time point information; judging a time point by the clock inside multimode wireless terminal 1501; or specifying a time point by receiving an extraneous wireless signal including time point information.

FIG. 16 shows an example of location-to-switch setting correspondence information in the multimode wireless terminal of the third embodiment. The time point information, indicating the current time point, has five types: time points A, B, C, D, and E. At time point A, switch setting <1-2-3> is used to communicate; at time point B, switch setting <1-2>-<3>.

In the third embodiment alike, as the initial state of multimode wireless terminal 1501, the switch setting is assumed to be switch setting 311 of <1-2-3>, where switching between the first, second, and third wireless communication systems is performed by parameter input, and the configuration of reconfigurable signal processor 201 is assumed to be configuration 301 of <<1-2-3>>, where switching between the first, second, and third wireless communication systems is performed by parameter input. Time is assumed to pass from time point A to time point B while multimode wireless terminal 1501 is communicating.

In the above-described configuration, when multimode wireless terminal 1501 communicates with plural wireless terminals by respectively corresponding wireless communication systems in the network system shown in FIG. 1, a description is made for the operation of automatically selecting an optimum manner of switching wireless communication systems with a switch setting determined according to time point information. The operation of switching wireless communication systems in multimode wireless terminal 1501 is the same as that shown in FIG. 5.

Figure 17:
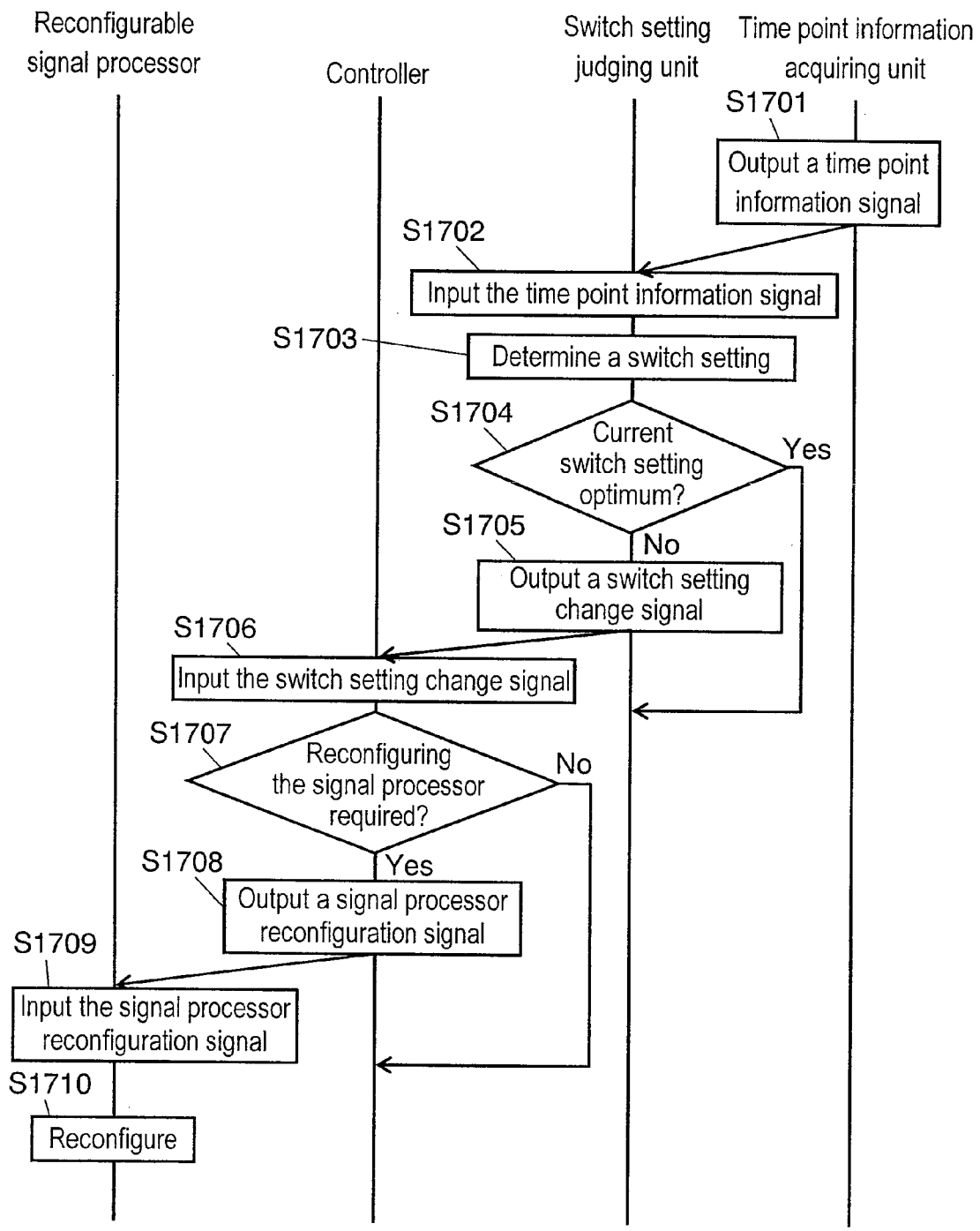
FIG. 17 illustrates an operation procedure for changing switch settings in the multimode wireless terminal of the third embodiment of the present invention.

FIG. 17 illustrates an operation procedure for changing the switch setting in the multimode wireless terminal of the third embodiment. Changing switch settings is performed by reconfigurable signal processor 201, controller 202, switch setting judging unit 203, and time point information acquiring unit 1502.

Time point information acquiring unit 1502 outputs a time point information signal to switch setting judging unit 203 periodically (step S1701). The time point information includes information related to the current time point.

Switch setting judging unit 203 is fed a time point information signal from time point information acquiring unit 1502 (step S1702) to determine an optimum switch setting of wireless communication systems on the basis of this information (step S1703).

In the third embodiment, the elements used for judging switch setting are time point information and time point-to-switch setting correspondence information. The time point-to-switch setting correspondence information, preliminarily retained by judgement information storing unit 204, is determined by information such as the circumstances of wireless communication systems used at each time point, switching frequency, and communication quality, at each time point.

When time passes from time point A to time point B while multimode wireless terminal 1501 is communicating, switch setting judging unit 203 compares current switch setting <1-2-3>, with switch setting <1-2>-<3> at time point B included in time point-to-switch setting correspondence information (step S1704). Then, unit 203 sends the switch setting <1-2>-<3> as a switch setting change signal to controller 202 (step S1705). The subsequent operation (steps S1706 through S1710) is the same as that shown in FIG. 6 (steps S606 through S610).

According to the third embodiment, when multimode wireless terminal 1501 communicates with another wireless terminal with the corresponding wireless communication systems switched, in an environment including multimode wireless terminal 1501 supporting plural different wireless communication systems, and plural wireless terminals each supporting a different wireless communication system, terminal 1501 can control switch settings according to a time point to automatically select an optimum switching manner. Thus, multimode wireless terminal 1501 reduces the power consumption and communicates efficiently.

In the third exemplary embodiment, when the current time point enters a range of a different time point included in time point-switch setting correspondence information, time point information acquiring unit 1502 may output a time point information signal to switch setting judging unit 203, and switch setting judging unit 203 may determine a switch setting. Meanwhile, when the user directs externally, or when reconfigurable signal processor 201 outputs a switching request signal, time point information acquiring unit 1502 may output a time point information signal to switch setting judging unit 203, and switch setting judging unit 203 may determine a switch setting.

Alternatively, reconfigurable signal processor 201 may receive a signal including time point information to determine a switch setting according to the time point information without using time point information acquiring unit 1502.

Multimode wireless terminals 101, 1201, 1501 of the embodiments first to third may be combined.

INDUSTRIAL APPLICABILITY

The multimode wireless communication apparatus and the wireless communication method of the present invention can automatically select an optimum manner of switching wireless communication systems according to a communication environment, thus applicable to multimode communication fields where plural wireless communication systems are switched to communicate.

The invention claimed is:

1. A multimode wireless communication apparatus to support a plurality of wireless communication systems and communicate by switching between wireless communication systems in the plurality of wireless communication systems, the apparatus comprising:
   a reconfigurable signal processor that supports the switching of the wireless communication systems by switching circuit functions according to one of a first switching method of switching circuit functions by controlling circuit parameters and a second switching method of switching circuit functions based on reconfiguration by rewriting software;
   a switch setting judging unit that determines a switch setting which defines as to which one of the first switching method and the second switching method is used to switch between the wireless communication systems in the plurality of wireless communication systems, the determination being based on (a) a number of times the wireless communication apparatus switches between the wireless communication systems in a predetermined unit of time and a duration of communication by each wireless communication system, (b) preliminarily-stored information about power consumption required by the switching between the wireless communication systems, and (c) preliminarily-stored information about power consumption required for each wireless communication system, such that the power consumption to be required for the switching between the wireless communication systems and for communication is minimized; and
   a controller that controls change of the circuit functions in the reconfigurable signal processor according to one of the first switching method and the second switching method based on the switch setting determined in the switch setting judging unit.

2. The multimode wireless communication apparatus according to claim 1, wherein the circuit parameters comprise at least one of a number of filter taps, a filter tap coefficient, and a bit width and a lookup table (LUT) size in a mapper process.

3. The multimode wireless communication apparatus according to claim 1, further comprising a judgment information storing unit that stores the information about the power consumption required by the switching of the wireless communication systems and the information about the power consumption required by each wireless communication system, wherein the switch setting judging unit determines the switch setting by acquiring, from the judgment information storing unit, the information about the power consumption required by the switching of the wireless communication systems and the information about the power consumption required by each wireless communication system.

4. The multimode wireless communication apparatus according to claim 1, further comprising a configuration information storing unit that holds configuration information required for the reconfiguration of the reconfigurable signal processor, wherein the reconfigurable signal processor switches the circuit functions according to the second switching method based on the configuration information acquired from the configuration information storing unit.

5. The multimode wireless communication apparatus according to claim 1, wherein the reconfigurable signal processor requests the controller to switch the wireless communication systems.

6. The multimode wireless communication apparatus according to claim 1, wherein the switch setting judging unit determines the switch setting at least periodically or when the reconfigurable signal processor requests the controller to switch the wireless communication systems.

7. A multimode wireless communication apparatus to support a plurality of wireless communication systems and communicate by switching between the wireless communication systems, the apparatus comprising:

a reconfigurable signal processor that supports the switching of the wireless communication systems by switching circuit functions according to one of a first switching method of switching circuit functions that switches between the plurality of communication systems by controlling circuit parameters and a second switching method of switching circuit functions that switches between the plurality of communication systems based on reconfiguration of the reconfigurable signal processor by rewriting software of the reconfigurable signal processor;

a location information acquiring unit that acquires information about a location of the multimode wireless communication apparatus;

a judgment information storing unit that holds location-to-switch setting correspondence information showing a correspondence between predetermined location information and a switch setting defining as to which one of the first switching method and the second switching method is used to switch between the wireless communication systems in the plurality of wireless communication systems;

a switch setting judging unit that determines the switch setting that defines which one of the first switching method and the second switching method is used to switch between the plurality of wireless communication systems based on the location information, acquired from the location information acquiring unit, and the location-to-switch setting correspondence information, acquired from the judgment information storing unit; and a controller that controls change of the circuit functions in the reconfigurable signal processor according to one of the first switching method and the second switching method based on the switch setting determined in the switch setting judging unit.

8. The multimode wireless communication apparatus according to claim 7, further comprising a configuration information storing unit that holds configuration information required for the reconfiguration of the reconfigurable signal processor, wherein the reconfigurable signal processor switches the circuit functions according to the second switching method based on the configuration information acquired from the configuration information storing unit.

9. The multimode wireless communication apparatus according to claim 7, wherein the reconfigurable signal processor requests the controller to switch the wireless communication systems.

10. The multimode wireless communication apparatus according to claim 7, wherein the switch setting judging unit determines the switch setting at least periodically or when the reconfigurable signal processor requests the controller to switch the wireless communication systems.

11. A multimode wireless communication apparatus to support a plurality of wireless communication systems and communicate by switching between the wireless communication systems, the apparatus comprising:

a reconfigurable signal processor that supports the switching of the wireless communication systems by switching circuit functions according to one of a first switching method of switching circuit functions that switches between the plurality of communication systems by controlling circuit parameters and a second switching method of switching circuit functions that switches between the plurality of communication systems based on reconfiguration of the reconfigurable signal processor by rewriting software of the reconfigurable signal processor;

a time point information acquiring unit that acquires time point information about a current time point;

a judgment information storing unit that holds time point-to-switch setting correspondence information showing a correspondence between predetermined time point information and a switch setting defining as to which one of the first switching method and the second switching method is used to switch between the wireless communication systems in the plurality of wireless communication systems;

a switch setting judging unit that determines the switch setting that defines which one of the first switching method and the second switching method is used to switch between the plurality of wireless communication systems based on the time point information, acquired from the time point information acquiring unit, and the time point-to-switch setting correspondence information, acquired from the judgment information storing unit; and a controller that controls change of the circuit functions in the reconfigurable signal processor according to one of the first switching method and the second switching method based on the switch setting determined in the switch setting judging unit.

12. The multimode wireless communication apparatus according to claim 11, further comprising a configuration information storing unit that holds configuration information required for the reconfiguration of the reconfigurable signal processor, wherein the reconfigurable signal processor switches the circuit functions according to the second switching method based on the configuration information acquired from the configuration information storing unit.

13. The multimode wireless communication apparatus according to claim 11, wherein the reconfigurable signal processor requests the controller to switch the wireless communication systems.

14. The multimode wireless communication apparatus according to claim 11, wherein the switch setting judging unit determines the switch setting at least periodically or when the reconfigurable signal processor requests the controller to switch the wireless communication systems.

15. A multimode wireless communication method to support a plurality of wireless communication systems and communicate by switching between wireless communication systems in the plurality of wireless communication systems, the method comprising:

switching the wireless communication systems by switching circuit functions according to one of a first switching method of switching circuit functions by controlling circuit parameters and a second switching method of switching circuit functions based on reconfiguration by rewriting software;

determining a switch setting defining as to which one of the first switching method and the second switching method is used to switch between the wireless communication systems in the plurality of wireless communication systems, the determination being based on (a) a number of times switching between the wireless communication systems in a predetermined unit of time and a duration of communication by each wireless communication system, (b) preliminarily-stored information about power consumption required by the switching between the wireless communication systems, and (c) preliminarily-stored information about power consumption required for each wireless communication system, such that the power consumption to be required for the switching between the wireless communication systems and for communication is minimized; and controlling change of the circuit functions according to one of the first switching method and the second switching method based on the determined switch setting.

16. A multimode wireless communication method to support a plurality of wireless communication systems and communicate by switching between wireless communication systems in the plurality of wireless communication systems, the method comprising:

switching the wireless communication systems by switching circuit functions according to one of a first switching method of switching circuit functions that switches between the plurality of communication systems by controlling circuit parameters and a second switching method of switching circuit functions that switches between the plurality of communication systems based on reconfiguration of the reconfigurable signal processor by rewriting software of the reconfigurable signal processor;

acquiring information about a location of a multimode wireless communication apparatus;

providing location-to-switch setting correspondence information showing a correspondence between predetermined location information and a switch setting defining as to which one of the first switching method and the second switching method is used to switch between the wireless communication systems in the plurality of wireless communication systems;

determining the switch setting that defines which one of the first switching method and the second switching method is used to switch between the plurality of wireless communication systems based on the acquired location information and the provided location-to-switch setting correspondence information; and controlling change of the circuit functions according to one of the first switching method and the second switching method based on the determined switch setting.

17. A multimode wireless communication method to support a plurality of wireless communication systems and communicate by switching between wireless communication systems in the plurality of wireless communication systems, the method comprising:

switching the wireless communication systems by switching circuit functions according to one of a first switching method of switching circuit functions that switches between the plurality of communication systems by controlling circuit parameters and a second switching method of switching circuit functions that switches between the plurality of communication systems based on reconfiguration of the reconfigurable signal processor by rewriting software of the reconfigurable signal processor;

acquiring time point information about a current time point;

providing time point-to-switch setting correspondence information showing a correspondence between predetermined time point information and a switch setting defining as to which one of the first switching method and the second switching method is used to switch between the wireless communication systems in the plurality of wireless communication systems;

determining the switch setting that defines which one of the first switching method and the second switching method is used to switch between the plurality of wireless communication systems based on the acquired time point information and the provided time point-to-switch setting correspondence information; and controlling change of the circuit functions according to one of the first switching method and the second switching method based on the determined switch setting.

* * * * *